United States Patent Office 2,713,057
Patented July 12, 1955

2,713,057

FLUORESCENT BENZOTRIAZOLE COMPOUNDS

Reinhard Zweidler and Ernst Keller, Basel, Switzerland, assignors to J. R. Geigy A. G., Basel, Switzerland, a Swiss firm No Drawing. Application June 19, 1952,
Serial No. 294,477

Claims priority, application Switzerland April 30, 1952

6 Claims. (Cl. 260—308)

The present invention concerns the production of blue-fluorescing monobenzotriazole compounds which are suitable in small amounts for the attainment of a purer white shade on more or less white materials as their blue fluorescent light is an optical compensation for the yellowish self-colour of the carrier substance.

2-(stilbyl-4″)-(naphtho-1′.2′.4.5) - 1.2.3 - triazol compounds have already been described in U. S. patent application Serial No. 268,695 filed January 28, 1952. These compounds are distinguished in that having only a very slight self-colour they have a beautiful blue fluorescence in ultraviolet and daylight and they are very stable to chlorine. On further work being done on this subject, it was found that contrary to previous experience, to attain a sufficient intensity of fluorescence, an annulated naphthalene radical is not absolutely necessary and that 2-(stilbyl-4′)-1.2.3-benzotriazole sulphonic acids of the general formula:

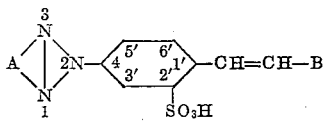

are also valuable compounds. In this formula A represents an o-phenylene radical and B a benzene radical both of which may be substituted as desired except by chromophores and salt-forming auxochromes. Chromophore substituents excluded from A and B are, for example, nitro or arylazo groups and the auxochromes excluded are the hydroxyl group, the amino, alkyl, aralkyl or arylamino groups, i. e, those salt-forming auxochromes in the narrowest sense of the Witt Dyeing Theory which enable azo coupling in aromatic hydrocarbons to take place. All these substituents strengthen the self-colour of the 2-stilbyl-benzotriazole compounds according to this invention to an undesirable degree and adversely influence or eliminate the fluorescence or reduce the fastness properties of the white shade, in particular the fastness to alkali and light. For example, halogens, alkyl, alkoxy, aryloxy, acyl-amino, acyloxy, carboxyl, sulphonic acid, carboxylic acid amide, sulphonic acid amide, alkyl sulphone, aryl sulphone groups come into question as admissible substituents in A and B.

The 2-(stilbyl-4′)-1.2.3-benzotriazole compounds according to the present invention are obtained by methods known per se by coupling diazotised 4-aminostilbene-2-sulphonic acids which may be further substituted as defined, with azo components of the benzene series coupling in the o-position to a primary amino or acyl-amino group, saponification of the acylamino group which may be present in certain cases and oxidation of the o-aminoazo dyestuff obtained to form the 1.2.3-triazole compound. Any disturbing auxochromic or chromophoric substituents which may be present in the latter compound are modified chemically or eliminated.

Diazo components which can be used are those obtained according to the method described in application Ser. No. 109,223, filed August 8, 1949 (now abandoned) for example 4-aminostilbene-2-sulphonic acid, 4-amino-stilbene-2.2′-disulphonic acid, 4-amino-4′-chloro- or 4′-methyl-, or 4′-methoxy-, or 2′-chloro-, or 2′-methoxy-stilbene-2-sulphonic acid. Also 4-amino-4′-nitrostilbene-2.2′-disulphonic acid and 4-amino-4′-acylaminostilbene-2.2′-disulphonic acids can be used.

The following compounds may be listed for example as azo components of the benzene series coupling in the o-position to a primary amino group: 1.3-diaminobenzene, 1.3-diaminobenzene-4-sulphonic acid, 4-methyl-, 4-chloro-, 4-methoxy-, 4-phenoxy-, 4-methylsulphone-1.3-diaminobenzene, 4-chloro- or 4-methyl-3-methoxy-1-aminobenzene, etc.; those coupling in the o-position to an acylated primary amino group are for example: 3-acetamino-1-hydroxybenzene, 3-acetamino - 1 - amino-benzene, 6-methyl- or 6-chloro or 6-methoxy-3-acetamino-1-aminobenzene.

Azo compounds of particular technical interest are 4-methyl-3-methoxy-1-aminobenzene and 1.3-diaminobenzene and also derivatives of the latter substituted by chlorine, methyl and methoxy groups in the 4-position.

The o-aminoazo dyestuff is oxidised to the 1.2.3-triazole by known methods, e. g. with ammoniacal copper sulfate in aqueous solution or suspension at a raised temperature or with alkali or earth alkali hypochlorites.

Any disturbing auxochromic or chromophoric substituents can be modified or eliminated according to the usual chemical methods. For example, it is advantageous to alkylate or acylate phenolic hydroxyl groups by converting them in an alkaline solution with, e. g., dialkyl sulphate or alkyl halide into the alkoxy groups. An acid chloride can also be used, e. g. p-toluene sulphochloride in which case they are converted into acyloxy groups. Primary amino groups are either acylated, e. g. with acetic acid anhydride into acetamino groups or with benzoyl halides into benzoyl amino groups, or they may be diazotised and the diazo group replaced by hydrogen according to known methods, e. g. boiling down in alcohol, or replaced by halogen according to Sandmeyer's method in the presence of copper salts. Nitro groups are reduced to amino groups and these are further treated as described above.

In order to avoid an undesirable shifting of the colour of the fluorescence towards green and to avoid a strong self-colour of the triazole compounds according to the present invention, the components should be so chosen that there are not too many substituents in the end product such as alkoxy and acylamino groups which make it strongly positive. In particular multiple substitution of the p- and o-positions to the ethylene linkage in the benzene ring B with these groups is to be avoided. It is of advantage if the acylamino group only occurs once as substituent.

Sparing substitution with acid water-solubilising groups is advantageous for the affinity to cellulose fibres of the benzotriazole compounds according to this invention; monosulphonic acids or the alkali salts thereof are more substantive than disulphonic acids. The degree of sulphonation is less critical for the affinity to wool and similar fibres from weakly acid baths; disulphonic acids and/or their alkali salts can also be used.

The new 2-(stilbyl-4′)-1.2.3-benzotriazoles according to this invention are more or less pale yellow coloured powders, which can be used in the form of their water soluble alkali salts. They produce very pure white shades on more or less white cellulose-containing material from an aqueous solution, which shades are very fast to light and chlorine. They are also suitable as additives to textile treatment liquors and to textile auxiliary products such as soaps and synthetic washing agents. They also have the desirable property in the usual concentrations of lending to the latter a white appearance. According to the composition they can also be used from a neutral to weakly acid bath for the brightening of wool and similar fibres, e. g. of superpolyamide and -polyurethane fibres.

Compared with the 4.4'-di-(naphthotriazolyl)-stilbene-2.2'-disulphonic acids which have been suggested as brightening agents, the new benzotriazole compounds have a much purer blue fluorescence, less self-colour and the important advantage of giving to textile auxiliary products mixed therewith an improved appearance.

The following examples illustrate the invention without limiting it in any way. Parts are given as parts by weight and the temperatures are in degrees centigrade.

*Example 1*

27.5 parts of 4-aminostilbene-2-sulphonic acid are dissolved in 200 parts of water with 4.1 parts of sodium hydroxide, 6.9 parts of sodium nitrite are added and the whole is indirectly diazotised at 8–10° with 25 parts of concentrated hydrochloric acid. The suspension of the diazo compound is coupled at 10–12° with a solution of 13.8 parts of 4-methoxy-1.3-diaminobenzene and 10 parts of concentrated hydrochloric acid in 200 parts of water. 40 parts of crystallised sodium acetate in 100 parts of water are added drop-wise, the whole is stirred until the coupling is complete. The o-aminoazo dyestuff is completely precipitated by the addition of common salt and is filtered off. The damp dyestuff is completely dissolved in water at 90–95° with the addition of 20 parts of 25% ammonia and then a mixture of 60 parts of crystallised copper sulphate in 240 parts of water and 120 parts of 25% ammonia is added. The solution is kept at a temperature of 92–95° until the o-aminoazo dyestuff has completely disappeared, it is allowed to cool and the 2-stilbyl-benzotriazole compound is completely precipitated on the addition of common salt. The raw product is dissolved in hot water in the presence of excess sodium sulphide, the copper sulphide formed is filtered off, the excess alkali sulphide compound is decomposed with hydrochloric acid and the product is purified by recrystallisation from water. The sodium salt of 5 - amino - 6 - methoxy-2-(stilbyl-4')-1.2.3-benzotriazole-2'-sulphonic acid is obtained as a yellowish-brownish substance. 39.2 parts of this 5-amino-6-methoxy-2-(stilbyl-4')-1.2.3-benzotriazole-2'-sulphonic acid as sodium salt are dissolved hot in 4000 parts of water, 6.9 parts of sodium nitrite are added and the whole is indirectly diazotised at 8–10° with 25 parts of concentrated hydrochloric acid. The diazo compound is completely salted out with common salt, filtered off and while still slightly damp is taken up in 1000 parts of boiling alcohol. It is boiled under reflux until there is no longer a diazo reaction, the de-aminated product is isolated and purified by recrystallisation from water or aqueous alcohol on the addition of animal charcoal and sodium hydrosulphite. The sodium salt of 6-methoxy-2-(stilbyl-4')-1.2.3-benzotriazole-2'-sulphonic acid is obtained as a yellowish-orange substance. Dyed on to cellulose fibres, this compound produces a beautiful bluish white shade which has good fastness properties, particularly to chlorine. The treatment bath may contain chlorine without any loss occurring in the brightening effect; also after-treatment of the brightened cellulose fibres with diluted hypochlorite solution does not injure the white shading.

*Example 2*

A solution of 27.5 parts of 4-aminostilbene-2-sulphonic acid, 4.1 parts of sodium hydroxide and 6.9 parts of sodium nitrite in 200 parts of water is indirectly diazotised at 8–10° with 25 parts of concentrated hydrochloric acid. The suspension of the diazo compound is coupled at 10–12° with a solution of 13.7 parts of 1-amino-3-methoxy-4-methyl benzene and 10 parts of concentrated hydrochloric acid in 200 parts of water and a solution of 40 parts of crystallised sodium acetate in 100 parts of water is added dropwise. On completion of the coupling, the o-aminoazo dyestuff is completely precipitated with common salt, filtered off and washed with diluted common salt solution. The damp dyestuff is completely dissolved in hot water at 90–95° on the addition of 20 parts of 25% ammonia and added to a mixture of 60 parts of crystallised copper sulphate in 240 parts of water with 120 parts of 25% ammonia. The temperature is kept at 92–95° until the o-aminoazo dyestuff is completely oxidised, whereupon the mixture is allowed to cool and the whole of the benzotriazole compound is salted out. The raw product is dissolved in hot water or aqueous alcohol in the presence of excess sodium sulphide, the copper sulphide which forms is filtered off, the excess alkali sulphide compound is decomposed with hydrochloric acid and the product is further purified by recrystallisation on the addition of animal charcoal and sodium hydrosulphite. The sodium salt of 6-methyl-5-methoxy - 2 - (stilbyl - 4') - 1.2.3 - benzotriazole - 2'-sulphonic acid is obtained as a pale yellowish substance. Cellulose fibres treated therewith attain a pure bluish white shade which has good fastness properties, particularly to chlorine. The treatment bath may contain active chlorine without loss of brightening effect and also after-treatment of the brightened cellulose fibres with active chlorine does not injure the white shade. In addition, the new compound can be used to give pale yellowish previously bleached wool a whiter appearance. Further, it can also be used in soap powders and synthetic washing agents to which, in daylight, it gives a whiter appearance.

If, in the above example, the 4-aminostilbene-2-sulphonic acid is replaced by 30.95 parts of 4-amino-4'-chlorostilbene-2-sulphonic acid, 6-methyl-5-methoxy-2-(4" - chlorostilbyl - 4') - 1.2.3 - benzotriazole - 2' - sulphonic acid is obtained. Also, in this example, the 4-aminostilbene-2-sulphonic acid can be replaced by 28.9 parts of 4-amino-4'-methylstilbene-2-sulphonic acid. On oxidation of the o-aminoazo dyestuff, the sodium salt of 4".6 - dimethyl - 5 - methoxy - 2 - (stilbyl - 4') - 1.2.3-benzotriazole-2'-sulphonic acid is obtained. These compounds produce a strong white shading on cellulose which with otherwise similar fastness properties have a somewhat green-bluish nuance.

A similarly active compound but one having one sulphonic acid group more is obtained if the 4-aminostilbene-2-sulphonic acid is replaced by 38.95 parts of 4-amino-4'-chlorostilbene-2.2'-disulphonic acid, indirectly diazotised and reacted with 13.7 parts of 1-amino-3-methoxy-4-methyl benzene to form the o-aminoazo dyestuff. The dyestuff is oxidised with ammoniacal copper sulphate solution to form the benzotriazole compound and finally purified. The di-sodium salt of 6-methyl - 5 - methoxy - 2 - (4" - chlorostilbyl - 4') - 1.2.3-benzotriazole-2'.2"-disulphonic acid is obtained as a pale yellow substance. This compound is a valuable brightening agent for cellulose fibres, soap powders and synthetic washing agents. With good fastness properties the white shade attained has a bluish white nuance and has excellent fastness to chlorine.

*Example 3*

41.2 parts of 4-amino-4'-acetaminostilbene-2.2'-disulphonic acid as disodium salt are dissolved in 200 parts of water, 6.9 parts of sodium nitrite are added and the whole is indirectly diazotised at 10–12° with 25 parts of concentrated hydrochloric acid. The suspension of the diazo compound is coupled at 12–15° with a solution of 13.7 parts of 1-amino-3-methoxy-4-methyl benzene and 10 parts of conc. hydrochloric acid in 200 parts of water and a solution of 40 parts of crystallised sodium acetate in 100 parts of water is slowly added. On completion of the coupling, the dyestuff is completely precipitated with common salt, filtered off and washed with diluted common salt solution. The damp dyestuff is completely dissolved in hot water at 90–95° on the addition of 20 parts of 25% ammonia and a mixture of 60 parts of crystallised copper sulphate in 240 parts of water and 120 parts of 25% ammonia is added. The temperature is kept at 92–95° until the o-aminoazo dyestuff is completely oxidised into the benzotriazole compound, whereupon the mixture is allowed to cool and the product is salted out. The raw product is dissolved in hot water in the presence of excess sodium sulphite, the copper sulphide which forms is filtered off, the excess alkali sulphide compound is decomposed with hydrochloric acid and the product is further purified by recrystallisation from water with the addition of animal charcoal and sodium hydrosulphite. Should diazotisation of a sample show the presence of a free amino compound resulting from the saponification of the acetamino group, the product is then acylated for example by heating under reflux with 100 parts of acetic acid anhydride for 2–4 hours at 120–130°. The disodium salt of 6-methyl-5-methoxy-2-(4″-acetaminostilbyl-4′)-1.2.3-benzotriazole-2′.2″-disulphonic acid is a yellowish powder. This new compound is a valuable brightening agent for cellulose fibres. The white shade attained therewith has a blue-white nuance and has excellent fastness to chlorine as well as excellent fastness to light. The product can also be used as brightening agent for soaps and synthetic washing agents and gives to them as it does to textiles treated therewith, a whiter appearance.

A similar product but one with a more greenish effect is obtained if the 1-amino-3-methoxy-4-methyl benzene is replaced by 10.8 parts of 1.3-diaminobenzene. 5-amino - 2 - (4″-acetaminostilbyl-4′)-1.2.3-benzotriazole-2′.2″-disulphonic acid is obtained by oxidation with ammoniacal copper sulphate solution.

5.29 parts of this compound are indirectly diazotized as described in Example 1 and the diazo group is replaced by hydrogen in boiling alcohol. After acylating when necessary, the product is purified by recrystallization. The disodium salt of 2-(4″-acetaminostilbyl-4′)-1.2.3-benzotriazole-2′.2″-disulphonic acid is obtained as a yellow substance.

If the m-phenylene diamine is replaced by 12.2 parts of 4-methyl-1.3-diaminobenzene, or by 13.8 parts of 4-methoxy-1.3-diaminobenzene, 6-methyl - 2-(4″ - acetaminostilbyl - 4′) - 1.2.3-benzotriazole-2′.2″-disulphonic acid or 6-methoxy-2-(4″-acetaminostilbyl-4′) - 1.2.3 - benzotriazole-2′.2″-disulphonic acid is obtained. Both products have properties similar to those described above. On the other hand, if instead of 4-amino - 4′ - acetaminostilbene-2.2′-disulphonic acid, 40.0 parts of 4.4′-nitraminostilbene-2.2′-disulphonic acid are indirectly diazotized and coupled with 13.7 parts of 1-amino-3-methoxy-4-methyl benzene to form the o-aminoazo dyestuff, then 6 - methyl-5-methoxy-2-(4″-nitrostilbyl - 4′)-1.2.3-benzotriazole-2′.2″-disulphonic acid is obtained by oxidation with ammoniacal copper sulphate solution. If this nitro compound is reduced to the amino compound with iron filings and hydrochloric acid according to Béchamp and then the free amino group is acetylated, 6 - methyl-5-methoxy-2-(4″-acetaminostilbyl-4′)-1.2.3-benzotriazole - 2′.2″ - disulphonic acid is obtained. The substance has the same properties as that obtained in another manner which is described above.

Further, the 1-amino-3-methoxy-4-methyl benzene can be replaced by 10.8 parts of 1.3-diaminobenzene. The dyestuff is oxidised to form 5-amino-2-(4″-nitrostilbyl - 4′)-1.2.3-benzotriazole-2′.2″-disulphonic acid, indirectly diazotized and the diazo group is boiled down in alcohol as described in Example 1. A compound identical to the 2-(4″-acetaminostilbyl-4′)-1.2.3-benzotriazole-2′.2″-disulphonic acid described above is obtained by reduction of the nitro group with iron filings and hydrochloric acid according to Béchamp and acetylation of the amino compound.

Example 4

27.5 parts of 4-aminostilbene-2-sulphonic acid and 4.1 parts of sodium hydroxide are dissolved in 200 parts of water and indirectly diazotized at 8–10° with 25 parts of concentrated hydrochloric acid. The suspension of the diazo compound is coupled at 10–12° with a solution of 10.8 parts of 1.3-diaminobenzene and 10 parts of concentrated hydrochloric acid in 200 parts of water and a solution of 40 parts of crystallized sodium acetate in 100 parts of water is slowly added. On completion of the coupling, the o-aminoazo dyestuff is completely precipitated with common salt, filtered off and washed with diluted common salt solution. The damp dyestuff is completely dissolved in hot water at 90–95° on the addition of 20 parts of 25% ammonia and a mixture of 60 parts of crystallised copper sulphate in 240 parts of water and 120 parts of 25% ammonia is added. The temperature is kept at 92–95° until the o-aminoazo dyestuff is completely oxidised into the benzotriazole compound, whereupon the mixture is allowed to cool and the product is salted out. The raw product is dissolved in hot water in the presence of excess sodium sulphide or hot diluted alcohol, the copper sulphide which forms is filtered off, the excess alkali sulphide compound is decomposed with hydrochloric acid and the product is further purified by recrystallisation from water or diluted alcohol. The sodium salt of 5-amino-2-(stilbyl-4′)-1.2.3-benzotriaozle-2′-sulphonic acid is obtained as a yellow greenish substance. To acetylate, 39.2 parts of this 5 - amino-2-(stilbyl-4′)-1.2.3-benzotriazole-2′-sulphonic acid are boiled under reflux for some hours in 200 parts of acetic acid anhydride and the acetic acid formed is removed, the residue is taken up in water, filtered after the remaining acetic acid anhydride has decomposed and the product is dissolved in water or diluted alcohol on the addition of soda until there is a weak alkaline reaction to Brilliant Yellow and recrystallised on the addition of animal charcoal and sodium hydrosulphite. The sodium salt of 5 - acetamino-2-(stilbyl-4′)-1.2.3-benzotriazole-2′-sulphonic acid is obtained as a yellowish substance. This compound is a valuable brightening agent for cellulose fibers, soap powders and synthetic washing agents and produces a pure bluish white shading on cellulose fibres treated therewith.

If in the above example, the 1.3-diaminobenzene is replaced by 14.25 parts of 4-chloro-1.3-diaminobenzene then 6-chloro - 5 - acetamino-2-(stilbyl-4′)-1.2.3-benzotriazole-2′-sulphonic acid is obtained by acetylation of the intermediate product 6-chloro-5-amino-2-(stilbyl-4′)-1.2.3-benzotriazole-2′sulphonic acid. The sodium salt of this compound is a pale yellowish coloured powder and is a valuable brightening agent for cellulose fibres. The nuance of the white shade attained therewith on cellulose fibers is more greenish-bluish than that of the compound described above. The shade is distinguished by good fastness to washing and light and a very good fastness to chlorine.

Further, the 1.3-diaminobenzene can be replaced by 12.2 parts of 4-methyl-1.3-diaminobenzene or 13.8 parts of 4-methoxy-1.3-diaminobenzene. Oxidation of the o-aminoazo dyestuffs produces 6-methyl-5-amino-2-(stilbyl-4′)-1.2.3-benzotriazole-2′-sulphonic acid or 6-methoxy-5-amino-2-(stilbyl-4′)-1.2.3-benzotriazole-2′-sulphonic acid. On acetylating with acetic acid anhydride as described in the above example, 6-methyl-5-acetamino-2-(stilbyl-4′)-1.2.3-benzotriazole-2′-sulphonic acid or 6-methoxy-5-acetamino-2-(stilbyl-4′)-1.2.3-benzotriazole-2′-sulphonic acid are obtained. These compounds are valuable brightening agents and have similar properties to the products already named.

Example 5

39.2 parts of the 5-amino-2-(stilbyl-4′)-1.2.3-benzotriazole-2'-sulphonic acid obtained according to Example 4 are dissolved in 200 parts of pyridine and reacted at 40–50° with 50 parts of benzoyl chloride. When the diazotisable amino group has disappeared the solution is taken up in 1000 parts of water and the substance which precipitates is filtered off. The product is purified by recrystallisation from diluted alcohol on the addition of animal charcoal. The sodium salt of 5-benzoylamino-2-(stilbyl-4')-1.2.3-benzotriazole-2'- sulphonic acid is obtained as a pale yellowish substance. This compound is a valuable brightening agent for cellulose fibres and also for polyamide fibres. With good fastness properties it is distinguished by a very good fastness to chlorine. The nuance of the white shading obtained therewith is more greenish blue than that of the product obtained according to Example 1.

A compound with similar properties is obtained if, instead of 5 - amino - 2-(stilbyl-4')-1.2.3-benzotriazole-2'-sulphonic acid, 40.6 parts of 6-methyl-5-amino-2-(stilbyl-4')-1.2.3-benzotriazole-2'-sulphonic acid is reacted with pyridine and benzoyl chloride. The sodium salt of 6-methyl-5-benzoyl-amino-2-(stilbyl-4')-1.2.3-benzotriazole-2'-sulphonic acid is obtained as a yellowish substance. Further the 5 - amino-2-(stilbyl-4')-1.2.3-benzotriazole-2'-sulphonic acid can be replaced by 42.2 parts of 6-methoxy - 5 - amino - 2 - (stilbyl-4')-1.2.3-benzotriazole-2'-sulphonic acid. The 5-benzoylamino-6-methoxy-2-(stilbyl-4')-1.2.3-benzotriazole-2'-sulphonic acid obtained is a green-yellowish substance. The product is a valuable brightening agent for cellulose fibres and linear polyamide fibres. Cellulose fibres treated therewith attain a pure bluish white shade which is distinguished by good fastness properties, especially good fastness to light and chlorine.

*Example 6*

White cotton poplin is treated with 0.03% (calculated on the weight of the material) of the sodium salt of 6-methyl-5-methoxy-2-(4''-chlorostilbyl-4')-1.2.3-benzotriazole-2'.2'''-disulphonic acid obtained according to Example 2 in the presence of 5% of Glauber's salt (calculated on the weight of the material) for 15 minutes at 40° (liquor ratio 1:50). After rinsing and drying, the treated material has a considerably whiter appearance than before treatment.

*Example 7*

1 part of white household wash, such as e. g. pillow cases, sheets, etc. are washed at 90–100° in the usual way in a 10 litre liquor containing 3 g. of curd soap, 2 g. of soda and 0.003 g. of the sodium salt of 6-methyl-5-methoxy-2-(4''-acetaminostilbyl-4')-1.2.3 - benzotriazole-2'.2'''-disulphonic acid obtained according to Example 3 per litre. The goods are then rinsed and dried. A dazzling white wash is obtained which has no disagreeable reddish tinge.

*Example 8*

100 parts of curd soap are homogeneously mixed with 0.05 part of the sodium salt of 6-methyl-5-methoxy-2-(stilbyl-4')-1.2.3-benzotriazole-2'-sulphonic acid obtained according to Example 2. The soaps or soap powders treated with stilbyl-benzotriazole have a whiter appearance in daylight than untreated products.

*Example 9*

1 part of white wash is washed in the usual way at 90–100° in 10 parts of a wash liquor containing 3 g. of curd soap homogeneously mixed with the brightening agent according to Example 8 and 2 g. of soda per litre. The goods are rinsed and dried. A dazzling white wash is obtained which has no disagreeable reddish tinge.

*Example 10*

25 parts of previously bleached and pale yellowish woolen yarn is treated for 30 minutes at 50–60° in a dyebath (liquor ratio 1:30) containing 0.04 part of the sodium salt of 6-methyl-5-methoxy-2-(stilbyl-4')-1.2.3-benzotriazole-2'-sulphonic acid obtained according to Example 2, 0.5 part of acetic acid and 2.5 parts of Glauber's salt. The goods are then rinsed and dried. The yarn so treated has a much whiter appearance than the untreated yarn.

*Example 11*

10 parts of pale yellowish nylon are treated for 30 minutes at 80–90° in a dyebath (liquor ratio 1:40) containing 0.04 part of 5-benzoylamino-2-(stilbyl-4')-1,2,3-benzotriazole-2'-sulphonic acid according to Example 5 and 0.3 part of acetic acid. The goods are rinsed with cold water and dried in the air. The material so treated has a much whiter appearance than untreated material.

What we claim is:

1. A benztriazole compound of the formula

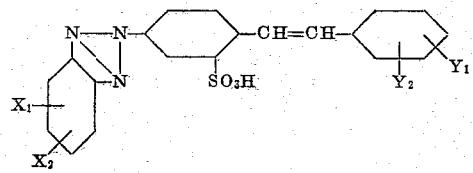

wherein each of $X_1$ and $X_2$ represents a member selected from the group consisting of H, $CH_3$, $CH_3O-$, Cl, $CH_3COHN-$ and

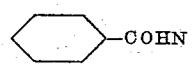

and each of $Y_1$ and $Y_2$ represents a member selected from the group consisting of H, $CH_3$, Cl, $CH_3COHN-$ and $-SO_3H$.

2. A benztriazole compound of the formula:

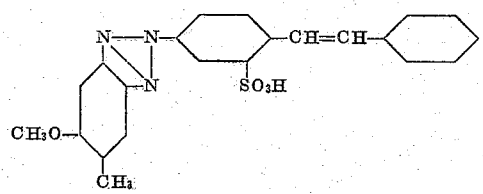

3. A benztriazole compound of the formula:

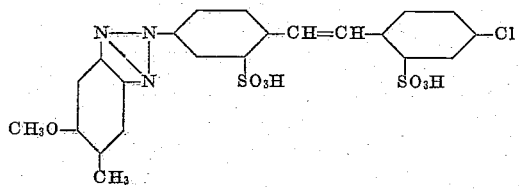

4. A benztriazole compound of the formula:

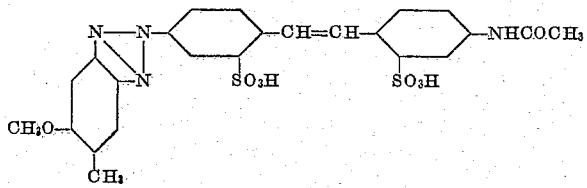

5. A benztriazole compound of the formula:

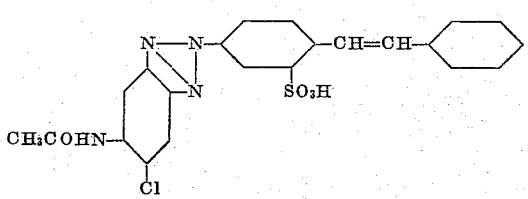

6. A benztriazole compound of the formula:
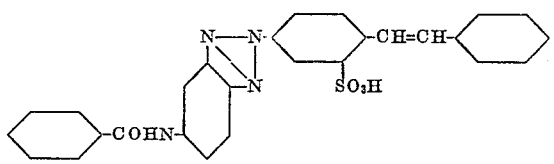
References Cited in the file of this patent
UNITED STATES PATENTS
2,467,262    Knight _____ Apr. 12, 1949
FOREIGN PATENTS
229,351    Switzerland _____ Jan. 17, 1944